United States Patent [19]

Strubhar

[11] 4,015,663

[45] Apr. 5, 1977

[54] METHOD OF SUBTERRANEAN STEAM GENERATION BY IN SITU COMBUSTION OF COAL

[75] Inventor: Malcolm K. Strubhar, Irving, Tex.

[73] Assignee: Mobil Oil Corporation, New York, N.Y.

[22] Filed: Mar. 11, 1976

[21] Appl. No.: 665,985

[52] U.S. Cl. .............................. 166/258; 166/259; 165/45

[51] Int. Cl.² ................. E21B 43/24; E21B 43/26; F24J 3/02; F28D 21/00

[58] Field of Search .......... 166/259, 258, 272, 271, 166/251, 256, 308; 165/45

[56] References Cited

UNITED STATES PATENTS

| | | | |
|---|---|---|---|
| 3,097,690 | 7/1963 | Terwilliger et al. | 166/259 |
| 3,159,215 | 12/1964 | Meldan et al. | 166/258 |
| 3,285,335 | 11/1966 | Reistle, Jr. | 166/259 X |
| 3,323,590 | 6/1967 | Gilchrist et al. | 166/258 X |
| 3,520,363 | 7/1970 | Bauer | 166/251 |
| 3,599,714 | 8/1971 | Messman | 166/259 X |
| 3,628,929 | 12/1971 | Glass et al. | 166/256 X |
| 3,775,073 | 11/1973 | Rhoades | 166/259 X |
| 3,835,928 | 9/1974 | Strubhar et al. | 166/308 |
| 3,863,709 | 2/1975 | Fitch | 165/45 |
| 3,924,680 | 12/1975 | Terry | 166/259 X |

Primary Examiner—Stephen J. Novosad
Attorney, Agent, or Firm—C. A. Huggett; Henry L. Ehrlich

[57] ABSTRACT

This specification discloses a method of recovering the thermal energy of a subterranean coal formation that is penetrated by at least two wells. The subterranean coal formation is fractured by hydraulic fracturing techniques to form at least two spaced apart fractures which extend through the coal formation and communicate with both of the wells. A combustion-supporting gas is injected into a first fracture and the coal is ignited to form a combustion front. Injection of the combustion-supporting gas is continued to propagate the combustion front through the coal formation along the first fracture. The heat or thermal energy generated by the combustion of the coal is conducted through the formation intermediate the fractures and into a second fracture. Water is injected via one well into the second fracture and flowed therethrough to the other well to absorb the thermal energy released by the combustion of the coal. The water, in absorbing the thermal energy, is at least partially converted into steam and the steam and associated hot water are produced via the other well to the surface of the earth.

4 Claims, 2 Drawing Figures

METHOD OF SUBTERRANEAN STEAM GENERATION BY IN SITU COMBUSTION OF COAL

BACKGROUND OF THE INVENTION

This invention is directed to a method of recovering the thermal energy of a coal formation by burning the coal in situ, generating steam with the resulting heat, and recovering the steam.

In U.S. Pat. No. 3,628,929 to Eugene D. Glass and Vaughan W. Rhoades, there is described a method for producing flammable gas and coal tar liquids by the in situ combustion of a coal seam. The process consists of completing wells in the coal seam, creating a horizontal fracture in the coal seam to establish communication in the wells, igniting the coal seam about the injection well, injecting a combustion-supporting gas, and recovering volatile liquids at the production well. A preferred method for controlling the temperature of the flame front and adjusting the calorific value of the produced gas is by the simultaneous injection of water with the combustion-supporting gas. In U.S. Pat. No. 3,775,073 to Vaughan W. Rhoades, there is described another process for the in situ combustion of a coal seam and the recovery of flammable gases and coal tar liquids therefrom. Two or more wells are completed in the coal seam and a horizontal fracture is created therein to establish communication between the wells. A first combustion-supporting gas is ignited within the horizontal fracture so as to form a horizontal and vertical fractured network between the wells. A second combustion-supporting gas is injected to propagate the combustion front through the coal about the injection well and the volatile liquids and combustible gases are recovered at the production well. There is disclosed a preferred method for controlling the temperature of the flame front and adjusting the calorific value of the produced gas by simultaneously injecting water with the combustion-supporting gas and obtaining a water-gas shift reaction at the site of the combustion front.

In U.S. Pat. No. 3,520,363 to Charles L. Bauer, there is described a process for the recovery of hydrocarbons from subterranean hydrocarbon-bearing formations by conducting an in situ combustion operation prior to water injection. In situ combustion is caused to occur in random pockets in a subterranean formation followed by water injection thereinto to scavenge the generated heat as part of a water drive and thereby produce additional hydrocarbons contained therein.

In U.S. Pat. No. 3,285,335 to Carl E. Reistle, Jr., there is described a method of in situ pyrolysis or recovery of organic carbonaceous materials from subterranean deposits of oil shale. A number of substantially horizontal shafts are drilled through an oil shale formation such that at least a pair of the shafts are in different horizontal planes and generally oriented in the same direction. Fracturing operations are conducted from at least one of the shafts so that the plane of the resulting fracture is vertically disposed so as to open communication between at least a pair of horizontal shafts. A thermal fluid having a temperature sufficient to pyrolyze the oil shale is introduced into the formation along the parted fractured plane whereby the sensible heat of the fluid is transferred to the surrounding oil shale formation and pyrolysis and vaporization of the kerogen content of the oil shale occur. The products of pyrolysis and vaporization are entrained in the thermal fluid and are recovered therewith at the earth's surface. In accordance with another aspect, the preferred fracture orientation in the oil shale formation is determined and the work shaft is drilled into the oil shale formation and from the work shaft a plurality of substantially horizontal shafts are drilled into the formation in order to penetrate the formation at angles not less than 30° and as near as 90° as possible relative to the preferred fracture orientation of the oil shale. The formation is then fractured from at least one of the horizontal shafts to open communication with at least one other of the horizontal shafts and thermal fluid is circulated to pyrolyze the oil shale and conduct the products of pyrolysis to the earth's surface.

In U.S. Pat. No. 3,835,928 to Malcolm K. Strubhar and Edwin E. Glenn, Jr., there is described a method for forming from a deviated well a plurality of vertically disposed fractures spaced a substantial distance apart in a subterranean formation having a known preferred fracture orientation.

In U.S. Pat. No. 3,863,709 to John L. Fitch, there is described a method and system for recovering geothermal energy from a subterranean geothermal formation having a preferred vertical fracture orientation wherein at least two deviated wells are provided which extend into the geothermal formation in a direction transversely of the preferred fracture orientation and a plurality of vertical fractures are hydraulically formed to intersect the deviated wells. A fluid is injected via one well into the fractures to absorb heat from the geothermal formation and the heated fluid is recovered from the formation via another well.

In a copending application, U.S. Ser. No. 660,079, filed Feb. 23, 1976, THERMAL ENERGY PRODUCTION BY IN SITU COMBUSTION OF COAL, by John L. Fitch and Malcolm K. Strubhar, there is disclosed a method of recovering thermal energy from a coal formation having a preferred vertical fracture orientation. An injection well and a production well are provided to extend into the coal formation and a vertical fracture is formed by hydraulic fracturing techniques and propagated into the coal formation to communicate with both wells. The vertical fracture is propped in the lower portion only. A combustion-supporting gas is injected into the propped portion of the fracture and the coal is ignited. Injection of the combustion-supporting gas is continued to propagate a combustion zone along the propped portion of the fracture and hot product gases generated at the combustion zone are produced to recover the heat or thermal energy of the coal. Water may also be injected into the fracture to transport the heat resulting from the combustion of the coal to the production well for recovery.

SUMMARY OF THE INVENTION

This invention is directed to a method of recovering the heat energy of a subterranean coal formation. At least a first well and a second well are provided that extend from the surface of the earth and communicate with the coal formation. A first fracture is formed by hydraulic fracturing techniques and propagated to extend through the coal formation and communicate with the first well and the second well. A second fracture spaced apart from the first fracture is formed by hydraulic fracturing techniques and propagated through the coal formation to communicate with the first well and the second well. A combustion-supporting gas is injected into the first fracture and the coal is ignited to form a combustion front. Injection of the combustion-supporting gas is continued to propagate the combustion front through the coal formation along the first fracture. The heat resulting from the combustion of the coal is conducted through the coal formation and into the second fracture. A fluid is injected into the second fracture to absorb the heat resulting from the combustion of the coal, thereby heating the fluid. The injection of the fluid into the second fracture is continued to flow the heated fluid through the second fracture and the heated fluid is produced to the surface of the earth.

DESCRIPTION OF THE PREFERRED EMBODIMENTS

Figure 1:
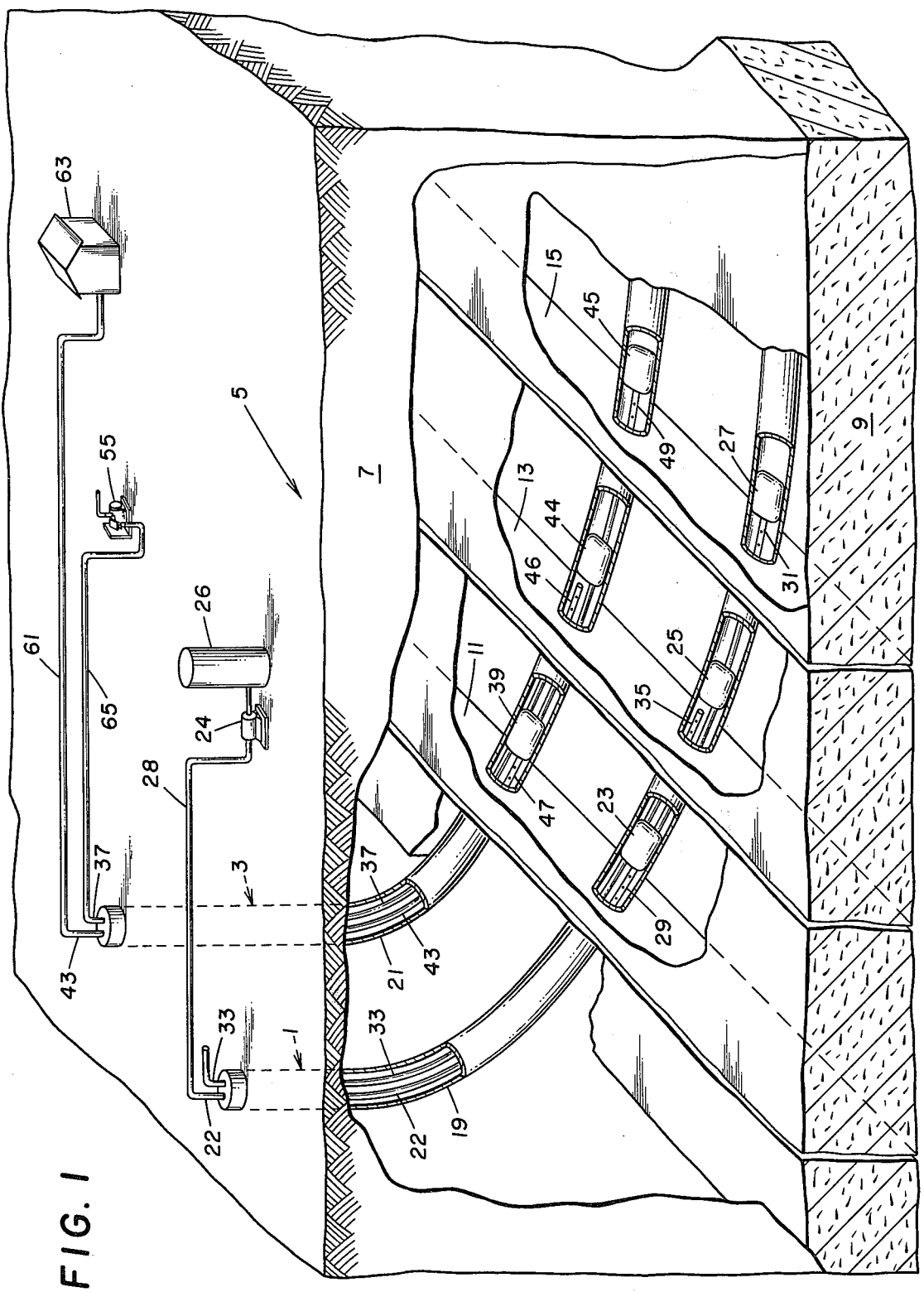
FIG. 1 is a partial cutaway perspective view illustrating the invention.

This invention relates to a process for burning a subterranean coal formation in situ and recovering the resulting heat for utilization at the surface of the earth.

In accordance with this invention there are provided at least two wells which extend from the surface of the earth and penetrate the subterranean coal formation. Desirably, the wells penetrate substantially the entire thickness of the coal formation. The subterranean formation is fractured using hydraulic fracturing techniques to produce at least two fractures which are spaced apart one from the other. Both of the fractures are propagated through the coal formation so that each communicates with both of the wells. A combustion-supporting gas is injected into one of the fractures and the coal is ignited to form a combustion front. Injection of the combustion-supporting gas is continued and the combustion front is propagated through the coal formation along the fracture that was ignited. The heat resulting from the combustion of the coal at the combustion front is conducted through the formation and into the other fracture. A fluid is injected into the second fracture to absorb the heat resulting from the combustion of the coal. Injection of the fluid into the other fracture is continued and the heated fluid is flowed through the other fracture and into the other well for recovery of the absorbed heat. The heated fluid may be produced to the surface of the earth to facilitate the utilization of the heat thereof or the heat may be transferred to a downhole heat exchanger to facilitate the transfer of the heat to the surface of the earth.

Subterranean coal formations, when subjected to hydraulic pressure in an amount sufficient to fracture the coal formation, fracture along the preferred fracture orientation of the coal formation. This preferred fracture orientation may be horizontal or vertical such that fractures form preferably along horizontal planes or vertical planes. Generally, subterranean formations, including coal formations, located at depths greater than about 2000 to 3000 feet have a preferred vertical fracture orientation. This invention is applicable for recovering the thermal energy of coal regardless of whether the coal formation has a preferred vertical or preferred horizontal fracture orientation. However, for simplicity and conciseness, this invention is described by reference to the drawing as being carried out in a formation which has a preferred vertical fracture orientation.

A technique for creating a plurality of vertically disposed fractures in a subterranean formation is described in the before-mentioned U.S. Pat. No. 3,835,928. This technique is applicable for forming two or more vertical spaced apart fractures which communicate with at least two wells that penetrate a subterranean coal formation having a preferred vertical fracture orientation. A similar technique is described in the before-mentioned U.S. Pat. No. 3,863,709 in conjunction with the recovery of geothermal energy from a geothermal reservoir. The U.S. Pat. No. 3,835,928 and U.S. Pat. No. 3,863,709 are incorporated by reference to fully describe applicable techniques for forming in a subterranean coal formation having a preferred vertical fracture orientation at least two vertical fractures which communicate with at least two wells.

Techniques for hydraulically fracturing a formation that has a horizontal fracture orientation and forming at least two horizontal fractures that extend through the formation to intersect two spaced apart wells are well known. Generally such techniques involve perforating casing in one well at two or more spaced apart levels to provide fluid communication with the formation and subsequently applying hydraulic pressure to the formation at each level to form and propagate a horizontal fracture into the formation to intersect the second well.

With reference to FIG. 1 this invention is described in more detail. Shown there are a first deviated well 1 and a second deviated well 3 extending from the surface of the earth 5 through an overburden 7 and penetrating a subterranean coal formation 9 having a preferred vertical fracture orientation. Vertical fractures 11, 13, and 15 are shown extending through the subterranean coal formation 9 and communicating with the first well 1 and the second well 3. This invention may be carried out using only two fractures which extend through the subterranean coal formation and communicate with the first and second wells, though normally it is preferred to use at least three such fractures. The first well 1 has a casing string 19 therein. The casing string 19 is perforated (not shown) in the plane of the fractures 11, 13, and 15 to provide communication intermediate the interior of the well and the fractures. Likewise, the second well 3 has therein a casing string 21 which is perforated (not shown) in the plane of the fractures.

In accordance with an embodiment of this invention, the first well 1 serves as an injection well for water and a recovery well for combustion products while the second well 3 serves as an air injection well and a production well for heated fluids. The well 1 has therein a tubing string 22 which extends down the well 1 through a dual string packer 23 positioned in the well 1 intermediate the vertical fracture 11 and the vertical fracture 13 and thence through a packer 25 positioned intermediate the vertical fracture 13 and vertical fracture 15 and thence through the plane of the vertical fracture 15 and terminates therebelow illustrated as terminated at a plug 27. Perforations 29 in the tubing string 22 provide fluid communication intermediate the tubing string 22 and the vertical fracture 11. Likewise, perforations 31 in the tubing string 22 provide fluid communication intermediate the tubing string 22 and the vertical fracture 15. A tubing string 33 extends down the well 1 and through the dual string packer 23 and terminates prior to the location of the packer 25. Perforations 35 in the tubing string 33 provide communication intermediate the tubing 33 and the vertical fracture 13. The lower end of the tubing string 33 may also be open thereby providing communication between the interior of the tubing string 33 and the vertical fracture 13. The second well 3 is equipped with a tubing string 37 which extends down the well 3 through another dual string packer 39 located intermediate the vertical fracture 11 and the vertical fracture 13 and terminates above another packer 44 positioned intermediate the vertical fracture 13 and the vertical fracture 15. The tubing string 37 contains perforations 46 to provide fluid communication intermediate the tubing string 37 and the vertical fracture 13. The second well 3 also contains a tubing string 43 which extends down the well through the dual string packer 39 and thence through the packer 44 and terminates as illustrated at another plug 45 positioned in the extension of the well 1 beyond the vertical fracture 15. The tubing string 43 contains perforations 47 to provide communication between the interior of the tubing string 43 and the vertical fracture 11. The tubing string 43 also contains perforations 49 to provide fluid communication intermediate the interior of the tubing string 43 and the vertical fracture 15. A combustion-supporting gas such as air is compressed by a compressor 55 and injected via a flow line 65 and tubing 37 down the well 3 through the perforations 46 and into the vertical fracture 13. The coal is ignited in the vicinity of the vertical fracture 13 to establish a combustion front (not shown). Known techniques may be used for igniting the coal and forming the combustion front. For example, oxygen may be injected down the well to facilitate the spontaneous combustion of the coal. Linseed oil may also be injected down the tubing 37 to facilitate the forming of the combustion front. Injection of the combustion-supporting gas is continued to propagate the combustion front through the coal formation along the vertical fracture 13. The heat resulting from the combustion of the coal is conducted through the coal formation 9 away from the vertical fracture 13 and into the vertical fractures 11 and 15 spaced on opposing sides of the vertical fracture 13. A fluid is pumped by a pump 24 from a fluid source 26 via a flow line 28 and down the tubing string 22 of the first well 1 and injected into the vertical fractures 11 and 15 and flowed therethrough to absorb the heat that results from the combustion of the coal. The fluid is flowed through the vertical fractures 11 and 15 and into the well 3 and thence up the tubing string 43 to the surface of the earth where the heated fluid is available for use. The heated fluid may, for example, be flowed from the tubing string 43 via a flow line 61 to a power plant 63 and there utilized in generating power. The combustion products resulting from the combustion of the coal are transported along the vertical fracture 13 and into the well 1 and thence into the tubing string 33 where they are flowed to the surface of the earth. The combustion products which may contain methane, carbon monoxide and hydrogen may be recovered (not shown) at the surface of the earth for use, or may be stored or disposed of as desired.

As described above, the fluid for absorbing the heat resulting from the combustion of the coal was flowed through the vertical fractures 11 and 15 adjacent the combustion fracture 13 to absorb the heat resulting from the combustion of the coal by injecting the fluid via tubing string 22 and well 1 into the fractures 11 and 15. If desired, the fluid for absorbing the heat may instead be injected (not shown) via the tubing string 43 and second well 3 into the vertical fractures 11 and 15 and flowed therethrough and into the well 1 and thence up the tubing string 33 to the surface of the earth. Any fluid which will absorb the heat resulting from the combustion of the coal and not damage the coal formation for example by plugging may be used in carrying out this step. Such fluids include aqueous fluids, gases and nonaqueous fluids. Water is a preferred fluid because it is readily available at economical costs and has suitable thermal properties including a suitable specific heat or heat capacity. The water in flowing through the fractures will absorb the heat, change to steam, and readily flow up the recovery well to the surface of the earth.

If desired, reverse in situ combustion may be carried out. Thus, after the combustion front is formed near the second well 3 the injection of air may be switched (not shown) to the tubing string 33 and thus flowed through the vertical fracture 13 to propagate the combustion front toward the first well 1. The combustible products would then be flowed into the second well 3 and up the tubing 37.

In accordance with still another embodiment of this invention, the combustion products resulting from the combustion of the coal are disposed of by injecting into an overlying subterranean formation rather than being produced to the surface of the earth. In accordance with this embodiment, the well into which the combustion products are produced is completed to facilitate the disposal of the combustion products into a subterranean formation which overlies the coal formation.

Figure 2:
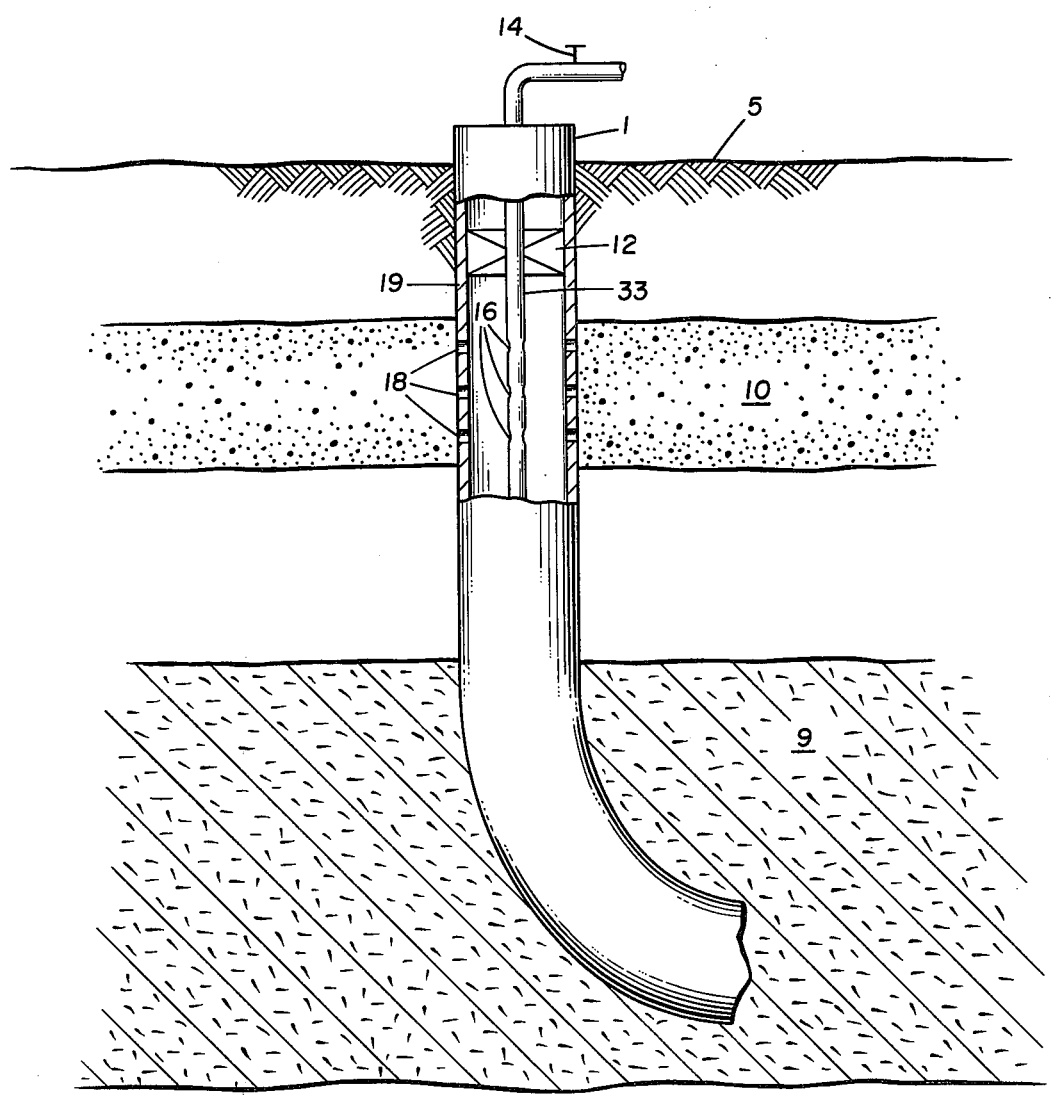
FIG. 2 is a schematic view illustrating another aspect of the invention.

To further illustrate this embodiment, reference may be had to FIG. 2 where a portion only of the first well 1 is illustrated in a partial cutaway view. There the well 1 is shown extending from the surface of the earth 5 and into the coal formation 9. The tubing string 33 through which the combustion products are flowed, as previously described, is illustrated as being perforated adjacent an overlying subterranean formation 10 which has sufficient permeability and porosity to permit the combustion products to be flowed thereinto and thu disposed of. A packer 12 is shown positioned in the well 1 to pack off the annulus formed between the casing 19 and the tubing string 33. By closing a valve 14 or otherwise closing off the upper extension of the tubing string 33, the combustion products are forced to flow through perforations 16 in the tubing string 33 and through perforations 18 provided in the casing 19 and thence into the subterranean formation 10 for disposal.

I claim:

1. A method of burning in situ a subterranean coal formation and recovering the heat resulting therefrom, comprising:
    a. providing a first well and a second well that extend from the surface of the earth and communicate with said coal formation;
    b. forming by hydraulic fracturing techniques a first fracture that extends through said coal formation and communicates with said first well and said second well;
    c. forming by hydraulic fracturing techniques a second fracture, spaced apart from said first fracture, that extends through said coal formation and communicates with said first well and said second well;
    d. injecting a combustion-supporting gas into said first fracture;
    e. igniting said coal to form a combustion front about said first fracture and to generate heat and hot product gases;

f. continuing to inject said combustion-supporting gas into said first fracture to propagate said combustion front through said coal formation along said first fracture and conduct said heat through said coal formation and into said second fracture;

g. injecting a fluid into said second fracture to absorb said heat and heat said fluid; and h. continuing to inject said fluid into said second fracture to flow said heated fluid through said second fracture to facilitate the recovery of said heat.

2. The method of claim 1 wherein said fluid that is injected into said second fracture to absorb said heat is water.

3. The method of claim 1 wherein the hot product gases are injected into an overlying permeable subterranean formation for disposal.

4. A method of burning in situ a subterranean coal formation and recovering the heat resulting therefrom, comprising:

a. providing a first well and a second well that extend from the surface of the earth and communicate with said coal formation;

b. forming by hydraulic fracturing techniques a first fracture that extends through said coal formation and communicates with said first well and said second well;

c. forming by hydraulic fracturing techniques a second fracture, spaced apart from said first fracture, that extends through said coal formation and communicates with said first well and said second well;

d. forming by hydraulic fracturing techniques a third fracture, spaced apart from said first fracture and on the side opposed to said second fracture, that extends through said coal formation and communicates with said first well and said second well;

e. injecting air down said first well and into said first fracture;

f. igniting said coal at said first well about said first fracture to form a combustion front about said first fracture and generate heat and hot product gases;

g. continuing to inject said air via said injection well into said first fracture to propagate said combustion front through said coal formation along said first fracture and conduct heat through said coal formation into said second fracture and said third fracture;

h. injecting water via said second well into said second fracture and said third fracture to absorb said heat and form steam;

i. continuing to inject said water via said second well into said second and third fractures to flow said steam through said fractures and into said first well;

j. producing said steam via said first well to the surface of the earth for utilization there; and k. producing said hot product gases via said second well to the surface of the earth.

* * * * *